United States Patent
Marukawa et al.

(10) Patent No.: US 11,167,802 B2
(45) Date of Patent: Nov. 9, 2021

(54) VEHICLE PILLAR STRUCTURE

(71) Applicant: HONDA MOTOR CO., LTD., Tokyo (JP)

(72) Inventors: Taiga Marukawa, Wako (JP); Kulchokrungsun Ninnart, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 16/624,384

(22) PCT Filed: Jul. 4, 2017

(86) PCT No.: PCT/JP2017/024493
§ 371 (c)(1),
(2) Date: Dec. 19, 2019

(87) PCT Pub. No.: WO2019/008668
PCT Pub. Date: Jan. 10, 2019

(65) Prior Publication Data
US 2020/0216118 A1 Jul. 9, 2020

(51) Int. Cl.
*B62D 25/04* (2006.01)
*B60R 16/08* (2006.01)

(52) U.S. Cl.
CPC ............. *B62D 25/04* (2013.01); *B60R 16/08* (2013.01)

(58) Field of Classification Search
CPC ...... B62D 25/04; B62D 29/002; B60R 16/09; B60R 16/08; B60J 7/0084
(Continued)

(56) References Cited

U.S. PATENT DOCUMENTS 7,494,179 B2 * 2/2009 Deachin .................. B60R 13/06
156/78
7,726,442 B2 * 6/2010 Belpaire .................. B60R 13/07
181/237
(Continued)

FOREIGN PATENT DOCUMENTS

JP 63-148580 9/1988
JP 01-081383 5/1989
(Continued)

OTHER PUBLICATIONS

International Search Report and Written Opinion for International Application Serial No. PCT/JP2017/024493 dated Aug. 15, 2017, 7 pages.
(Continued)

*Primary Examiner* — Dennis H Pedder
(74) *Attorney, Agent, or Firm* — Amin, Turocy & Watson, LLP

(57) ABSTRACT

A vehicle pillar structure is equipped with a pillar main body having a closed cross-section extending along a longitudinal direction; a separator which is attached to the inside of the pillar main body to extend in a direction intersecting the longitudinal direction of the pillar main body, and partitions the inside of the pillar main body into a plurality of space parts in the longitudinal direction; and an insertion member which extends along the longitudinal direction of the pillar main body and is disposed inside the pillar main body to straddle the plurality of the space parts. A filling hole for filling a filler in any one of the space parts inside is provided in the pillar main body. A guide part configured to guide the insertion member to a position at which the filling hole is not blocked is provided in the separator.

5 Claims, 7 Drawing Sheets

(58) Field of Classification Search
USPC .............................. 296/213, 193.06, 187.12
See application file for complete search history.

(56) References Cited

U.S. PATENT DOCUMENTS

| | | | |
|---|---|---|---|
| 8,444,214 B2* | 5/2013 | Helferty | B60R 13/07 |
| | | | 296/193.06 |
| 8,573,355 B2* | 11/2013 | Franey | B60R 13/08 |
| | | | 181/264 |
| 8,911,008 B1* | 12/2014 | Campbell | B60J 7/0084 |
| | | | 296/213 |
| 8,991,900 B2 | 3/2015 | Yamaji et al. | |
| 2016/0257344 A1 | 9/2016 | Hasegawa et al. | |
| 2016/0297479 A1 | 10/2016 | Ritschel et al. | |

FOREIGN PATENT DOCUMENTS

| | | |
|---|---|---|
| JP | 01-109468 | 7/1989 |
| JP | 01-125278 | 8/1989 |
| JP | 2013-203266 | 10/2013 |
| JP | 2016-159813 | 9/2016 |

OTHER PUBLICATIONS

Indian Office Action for Indian Patent Application No. 201947053440 dated Nov. 25, 2020.

* cited by examiner

VEHICLE PILLAR STRUCTURE

TECHNICAL FIELD

The present invention relates to a vehicle pillar structure.

BACKGROUND ART

As a pillar structure disposed on a side part or the like of a vehicle, a structure in which a filler such as foamed urethane is filled inside a pillar main body in which a closed cross-section is continuous in a longitudinal direction is known (for example, Patent Document).

The pillar structure described in Patent Document 1 is configured so that a filling hole for the filler is provided in a pillar inner panel that constitutes the pillar main body, and the filler is filled inside the pillar main body through the filling hole. In addition, a restriction member for restricting the flow of the filler along the longitudinal direction in the pillar main body is provided inside the pillar main body.

Also, as the vehicle pillar structure, a structure in which a drain hose extending in the longitudinal direction of the pillar main body is disposed inside the pillar main body is known (for example, see Patent Document 2).

Currently, in a pillar structure in which a filler is filled into a pillar main body, it is conceivable that a long insertion member such as a drain hose be disposed inside the pillar main body.

However, the long insertion member such as a drain hose may hinder the flow of the filler which flows in from a filling hole inside the pillar main body. For this reason, when a long insertion member is disposed inside the pillar main body, it is thought that there will be a likelihood that a filling state of the filler with respect to the pillar main body will become unstable.

CITATION LIST

Patent Document

[Patent Document 1]
  Japanese Utility Model Publication No. H1-125278
[Patent Document 2]
  Japanese Utility Model Publication No. H1-81383

SUMMARY OF INVENTION

Technical Problem

An object of the present invention is to enable the insertion member to be disposed inside a pillar main body, without hindering filling of a filler from a filling hole.

Solution to Problem

A vehicle pillar structure of the present invention is equipped with a pillar main body having a closed cross-section extending along a longitudinal direction; a separator which is attached to the inside of the pillar main body to extend in a direction intersecting the longitudinal direction of the pillar main body, and partitions the inside of the pillar main body into a plurality of space parts in the longitudinal direction; and an insertion member which extends substantially along the longitudinal direction of the pillar main body and is disposed inside the pillar main body to straddle the plurality of the space parts. A filling hole for filling a filler into any one of the space parts inside is provided on a side wall of the pillar main body, and a guide part configured to guide the insertion member to a position at which the filling hole is not blocked is provided in the separator.

With the above configuration, the insertion member disposed inside the pillar main body is guided to a position at which the filling hole is not blocked by being guided to the guide part of the separator. For this reason, when the filler is filled from the filling hole in a state in which the insertion member is disposed inside the pillar main body, the filler is filled into the space part of the pillar main body without being blocked by the insertion member. Further, in the above configuration, the guide part is provided in the separator, without providing a dedicated guide member for guiding the insertion member. For this reason, the number of components can be reduced.

The pillar main body may include a pillar outer panel which forms the closed cross-section, and a pillar inner panel, the filling hole may be provided in the pillar inner panel, and the separator may be attached to the pillar inner panel.

In this case, although the rigidity of the pillar inner panel is likely to be lowered by the filling hole, since the separator is attached to the pillar inner panel, deterioration in rigidity of the pillar inner panel due to the filling hole is compensated for.

The separator may include at least two joining walls joined to the pillar inner panel at a position outward in a width direction and at a position inward in the width direction with respect to a center of the filling hole, and a connecting wall which extends in a direction intersecting the longitudinal direction of the pillar main body to connect the joining walls to each other, and the guide part may be provided on the connecting wall.

In this case, since the joining walls are joined to each of the outer side and the inner side in the width direction of the center of the filling hole of the pillar inner panel, and the joining walls are connected by the connecting wall, the rigidity of the region surrounding the filling hole of the pillar inner panel can be effectively increased by the separator. Further, in this case, since the guide part is disposed on the side of the separator away from the pillar inner panel, the insertion member hindering flow of the filler when the filler is filled in from the filling hole is better able to be curbed.

The pillar main body may further include a pillar stiffener extending in the longitudinal direction to divide the closed cross-section of the pillar main body between the pillar outer panel and the pillar inner panel, the pillar stiffener may have an introduction hole for introducing the filler, which has flowed into the closed cross-section between the pillar inner panel and the pillar stiffener from the filling hole, into the closed cross-section between the pillar stiffener and the pillar outer panel, and the guide part may be configured to guide the insertion member to a position at which the introduction hole is not blocked.

In this case, the guide part of the separator can prevent the introduction hole on the pillar stiffener side from being blocked by the insertion member. Therefore, when this configuration is adopted, the filler can be smoothly filled into the closed cross-section between the pillar stiffener and the pillar outer panel.

The introduction hole may be disposed above the filling hole, and the guide part may be configured to guide the insertion member so that the insertion member is located below an upper end region of an introduction path of the filler which linearly connects together the filling hole and the introduction hole.

In this case, even if the insertion member hangs down due to its own weight, the insertion member does not greatly block the introduction path of the filler directed from the filling hole to the introduction hole. In addition, although the filler flowing in from the filling hole may gradually become inclined further downward on the way to the introduction hole, at that time, the direction if the filler is changed again toward the introduction hole, due to coming into contact with the upper part of the insertion member. Therefore, when this configuration is adopted, it is possible to make the filler smoothly flow in the direction of the introduction hole.

A guide member which guides the insertion member on the side in front of the separator in an insertion direction of the insertion member may be provided inside the pillar main body, and the guide member may include a first guide surface which guides the insertion member in a direction away from a lower inner surface of the pillar main body, and a second guide surface which guides the insertion member separated by the first guide surface to a lower inner surface side of the pillar main body.

In this case, the insertion member is temporarily separated from the lower inner surface of the pillar main body by the guide member on the front side in the insertion direction from the separator, and then the direction thereof is changed to the lower inner surface side of the pillar main body again. For this reason, the insertion member can be easily disposed below the upper end region of the introduction path of the filler that linearly connects together the filling hole and the introduction hole at the position at which the separator is disposed.

The separator may be inclined in a direction away from the pillar inner panel in an insertion direction of the insertion member.

In this case, since the separator is inclined to follow the insertion direction of the insertion member, when the insertion member is disposed to be inserted into the pillar main body, the insertion member is less likely to be caught by the separator. Therefore, when this configuration is adopted, the insertion member can be easily disposed inside the pillar main body.

Advantageous Effects of Invention

In the vehicle pillar structure according to the present invention, a separator attached to the inside of the pillar main body is provided with a guide part for guiding the insertion member to a position at which the filling hole is not blocked. For this reason, the insertion member can be disposed inside the pillar main body, without hindering the filling of the filler from the filling hole.

DESCRIPTION OF EMBODIMENTS

Figure 1:
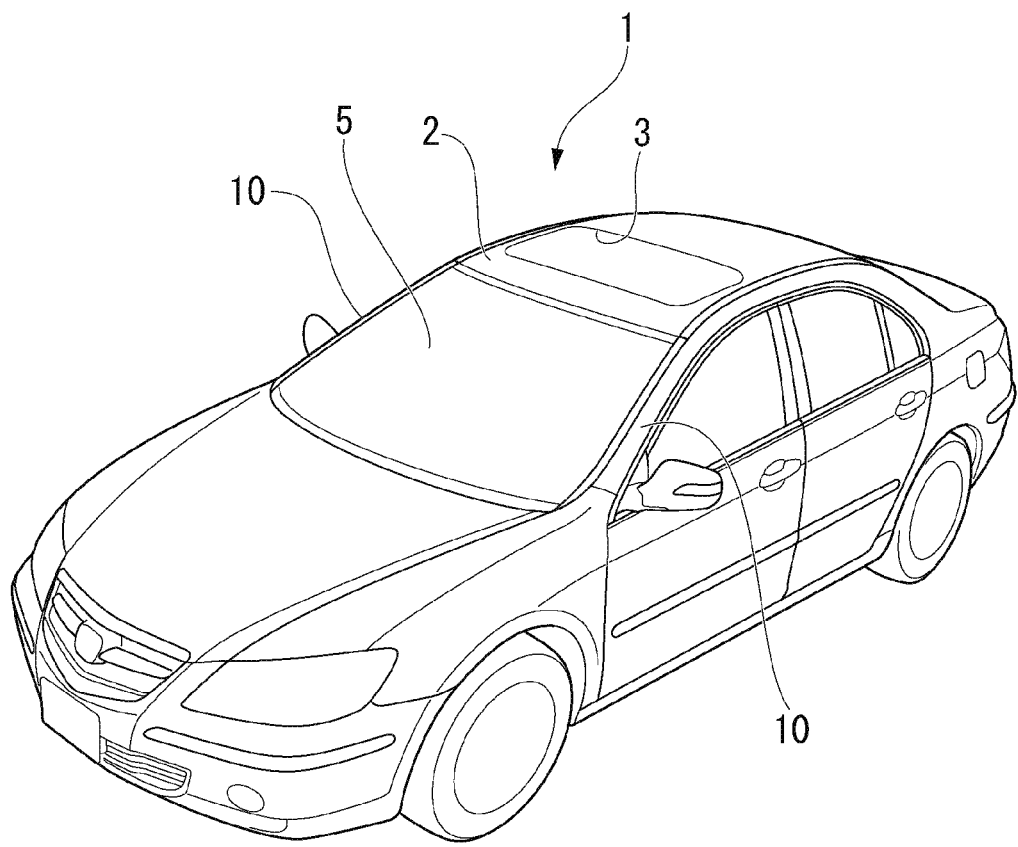
FIG. 1 is a perspective view of a vehicle according to an embodiment.
Figure 1:
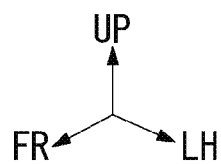

Hereinafter, embodiments of the present invention will be described with reference to the drawings. In the following description, forward, rearward, upward, downward, left and right mean front, rear, top, bottom, left and right in a vehicle unless otherwise specified. In addition, an arrow FR in the drawing indicates a front part of the vehicle, an arrow UP indicates an upper part of the vehicle, and an arrow LH indicates a left side part of the vehicle.

FIG. 1 is a view of a vehicle 1 that adopts a pillar structure of the present embodiment as viewed obliquely from above to the left.

Front pillars 10 that extend obliquely upward from the lower ends of the side parts of a windshield glass 5 toward a roof part 2 are provided on both the left and right sides of an interior front part of the vehicle 1. The pillar structure of the present embodiment is adopted for the front pillars 10. However, the pillar structure of the present embodiment can also be used for a rear pillar, a center pillar, and the like other than the front pillars 10.

Figure 2:
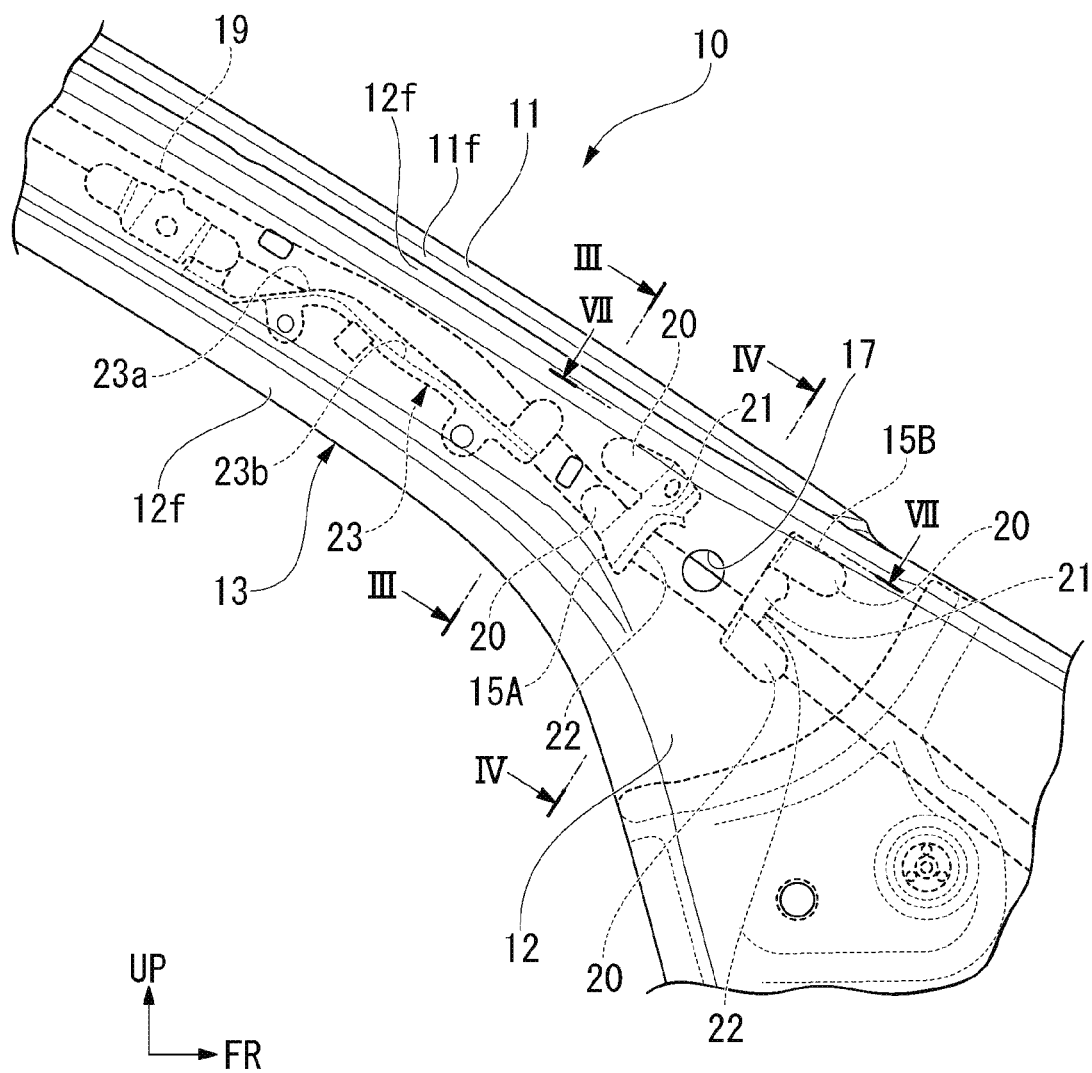
FIG. 2 is a side view of a pillar structure according to the embodiment as viewed from inside the vehicle interior.
Figure 3:
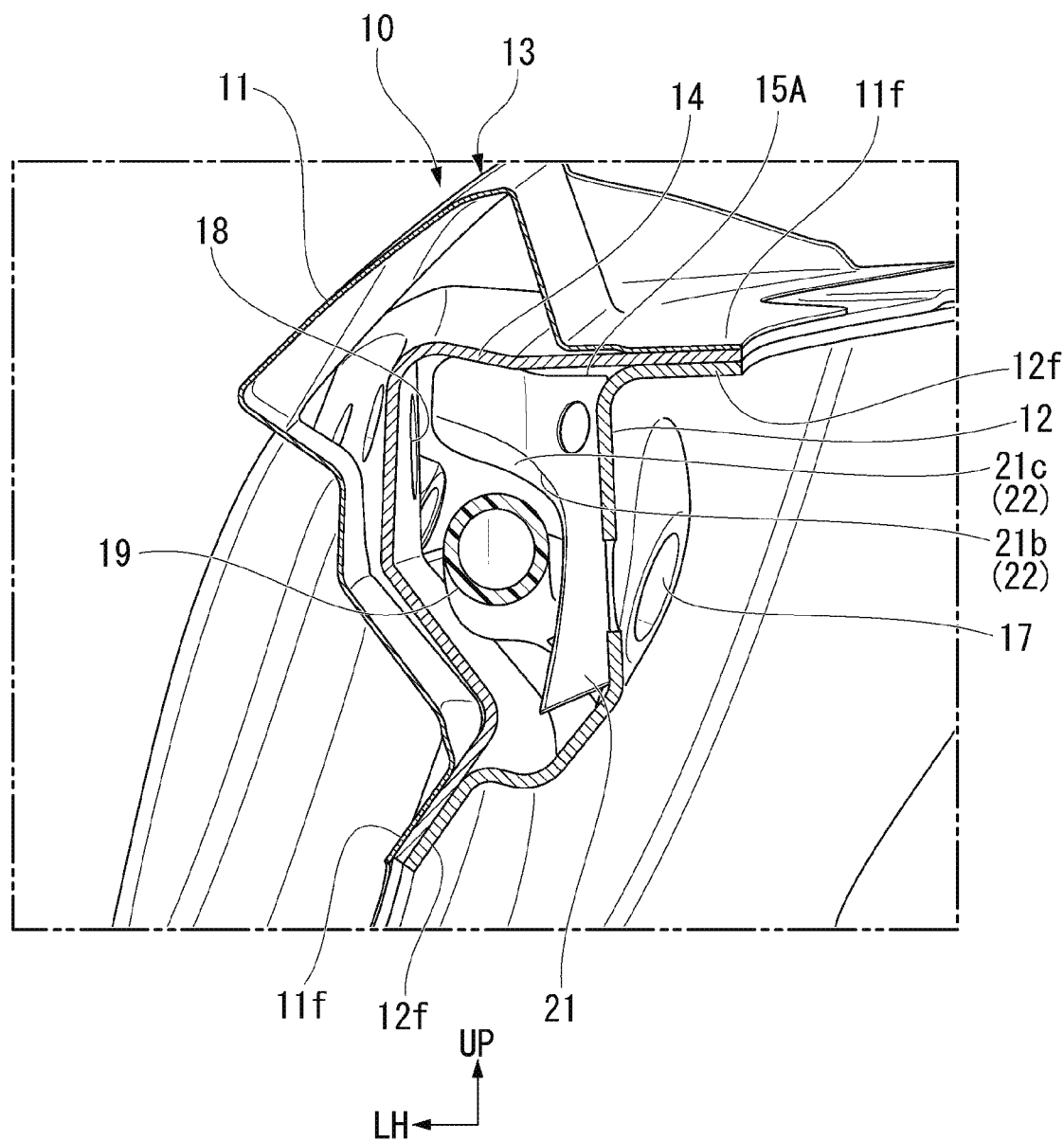
FIG. 3 is a partial cross-sectional perspective view of the pillar structure of the embodiment taken along a line III-III FIG. 2.

FIG. 2 is a view of the front pillar 10 as viewed from the vehicle interior inner side. FIG. 3 is a perspective view of the front pillar 10 taken along a line of the front pillar 10 in FIG. 2, and FIG. 4 is a cross-sectional view of the front pillar 10 taken along a line IV-IV of FIG. 2.

Figure 4:
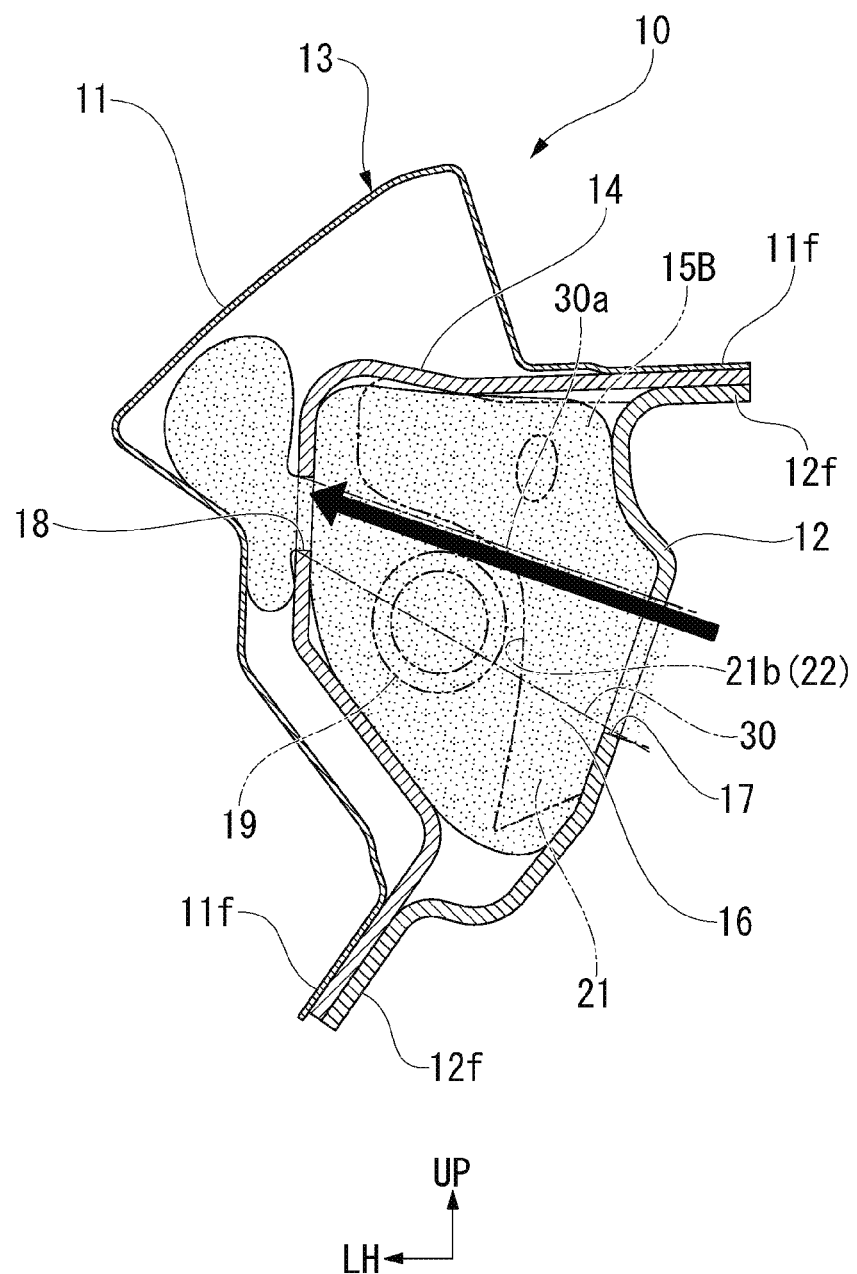
FIG. 4 is a cross-sectional view of the pillar structure according to the embodiment taken along a line IV-IV of FIG. 2.

As shown in FIGS. 3 and 4, the main part of the pillar main body 13, in which a closed cross-section is continuous in the longitudinal direction, is configured by a pillar outer panel 11 and a pillar inner panel 12 which are metal panels being joined to each other in the front pillar 10. The pillar outer panel 11 and the pillar inner panel 12 have joining flanges 11$f$ and 12$f$ at upper and lower end portions, respectively. The pillar outer panel 11 and the pillar inner panel 12 are integrated by joining the joining flanges 11$f$ and 12$f$ to each other. A metallic pillar stiffener 14 extending in the longitudinal direction to divide the closed cross-section of the pillar main body 13 into two parts is interposed between the pillar outer panel 11 and the pillar inner panel 12. The pillar stiffener 14 is welded and fixed to both the joining flanges 11$f$ and 12$f$ of the pillar outer panel 11 and the pillar inner panel 12, in the state of being sandwiched between the joining flanges 11$f$ and 12$f$.

Figure 5:
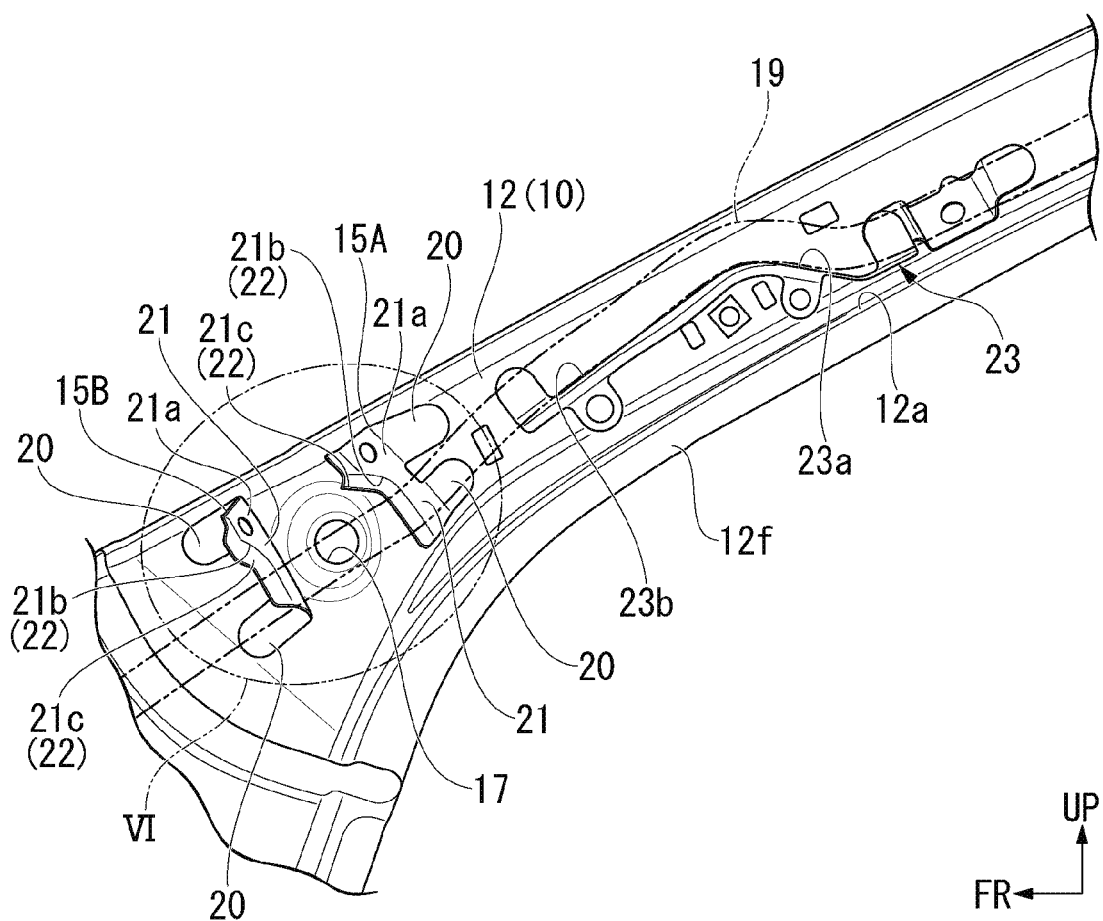
FIG. 5 is a side view of the pillar structure of the embodiment when viewed from outside of the vehicle with some members removed.
Figure 6:
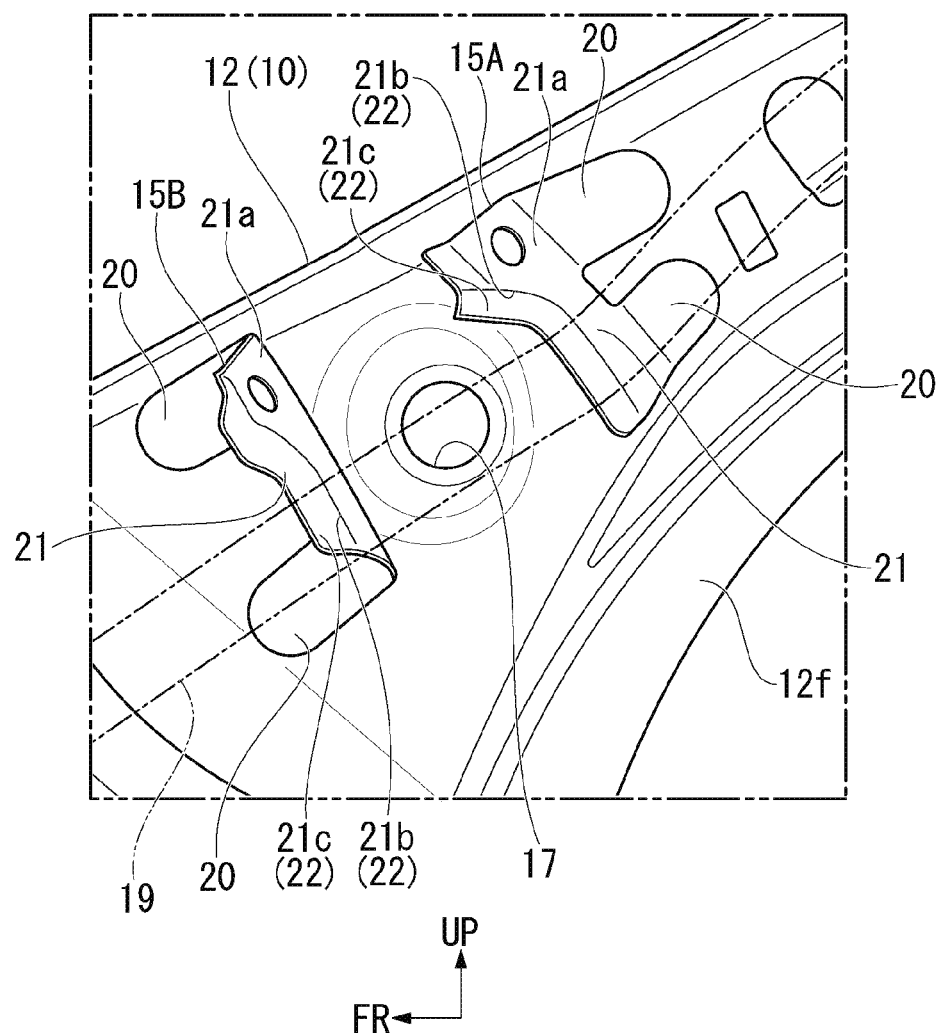
FIG. 6 is an enlarged view of a part VI of FIG. 5 of the pillar structure according to the embodiment.
Figure 7:
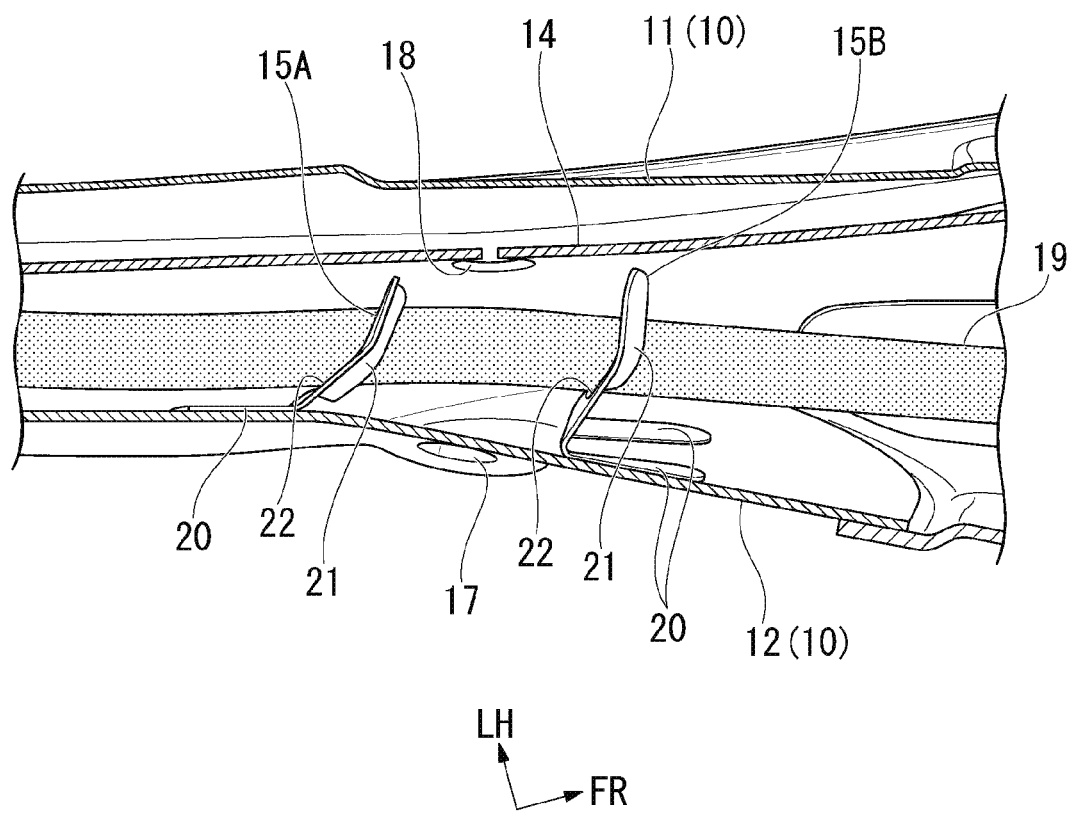
FIG. 7 is a partial cross-sectional perspective view of the pillar structure according to the embodiment taken along a line VII-VII of FIG. 2.

FIG. 5 is a view as viewed from outside of the vehicle with the pillar outer panel 11 and the pillar stiffener 14 removed from the pillar main body 13, and FIG. 6 is an enlarged view of a part VI of FIG. 5. FIG. 7 is a cross-sectional view of the front pillar 10 taken along a line VII-VII of FIG. 2.

A pair of metallic separators 15A and 15B that divide the inside of the pillar main body 13 into a plurality of space parts in the longitudinal direction is attached to the inside of the pillar main body 13. The separators 15A and 15B are joined to the surface of the pillar inner panel 12 on a side facing the inside of the closed cross-section of the pillar main body 13 (inside of the closed cross-section between the pillar inner panel 12 and the pillar stiffener 14). The separators 15A and 15B are attached at two positions spaced apart from each other in the longitudinal direction of the pillar inner panel 12, and each of them extends in a direction intersecting the longitudinal direction of the pillar main body 13. Further, a circular filling hole 17 for filling a filler 16 such as foamed urethane (see FIG. 4) inside the pillar main body 13 is formed at a position of the pillar inner panel 12 facing the space part partitioned by the pair of separators 15A and 15B.

After the pillar main body 13 is assembled into the filling hole 17, a nozzle part of a filling gun is inserted from the vehicle interior inner side of the pillar inner panel 12. The filler 16 flowing into the filling hole 17 from the filling gun is filled into the space part between the separators 15A and 15B in the closed cross-section between the pillar inner panel 12 and the pillar stiffener 14, and is also filled in a part of the closed cross-section between the pillar stiffener 14 and the pillar outer panel 11. An introduction hole 18 is formed in the pillar stiffener 14 at a position facing the space part between the separators 15A and 15B. The introduction hole 18 introduces the filler 16, which has flowed into the space part between the separators 15A and 15B, into the closed cross-section between the pillar stiffener 14 and the pillar outer panel 11. The filler 16 filled in the closed cross-section of the pillar main body 13 is cured in a state in which a part of the closed cross-section in the longitudinal direction is substantially closed (a foaming shape is stabilized). The filling hole 17 is closed by a lid member (not shown) after the pillar main body 13 is filled with the filler 16. Further, the separators 15A and 15B restrict the flow of the filler 16 in the closed cross-section between the pillar inner panel 12 and the pillar stiffener 14.

Further, a drain hose 19 extending substantially along the longitudinal direction of the pillar main body 13 is disposed inside the pillar main body 13. The drain hose 19 is disposed across a plurality of space parts in the pillar main body 13 partitioned by the separators 15A and 15B. The drain hose 19 is a resin hose for discharging water, which has flowed into a flange part (not shown) inside a sunroof opening 3 provided in the roof part 2 of the vehicle, to the lower part of the vehicle. The drain hose 19 constitutes the insertion member in the present embodiment.

Here, each of the separators 15A and 15B is equipped with a pair of joining walls 20 joined to the surface on the closed cross-section side of the pillar inner panel 12, and a connecting wall 21 which rises from one end side of both joining walls 20 in a direction away from the pillar inner panel 12 and extends in a direction intersecting an extending direction of the pillar inner panel 12 (the pillar main body 13). The pair of joining walls 20 is joined to a position on an outer side in a width direction and a position on an inner side in the width direction with respect to the center of the filling hole 17, in the pillar inner panel 12. Further, the connecting wall 21 extends in the width direction of the pillar inner panel 12 (a direction intersecting the longitudinal direction of the pillar main body 13), and connects the joining wall 20 on the inner side in the width direction and the joining wall 20 on the outer side in the width direction to each other. The pair of joining walls 20 and the connecting wall 21 are integrally formed by a single metal plate.

In addition, the surface of the pillar inner panel 12 to which the separators 15A and 15B are attached is provided to follow a front-rear direction and a vertical direction of a vehicle body. Therefore, the joining walls 20 of the separators 15A and 15B rise from the pillar inner panel 12 toward the side part of the vehicle body.

The connecting wall 21 of each of the separators 15A and 15B is provided with a notch part 21b on an extending end side of a base part 21a rising from the end portions of both the joining walls 20. The notch part 21b is notched in a substantially rectangular shape so that a front view shape of the base part 21a is substantially an L-shape. A flange part 21c that is bent in a direction substantially orthogonal to the extending surface of the base part 21a is provided to extend from an end edge of the notch part 21b. The notch part 21b and the flange part 21c of the connecting wall 21 constitute a guide part 22 that guides the drain hose 19 that is the insertion member.

The guide part 22 is provided at a position on the lower part of the vehicle outside of the base part 21a in a state in which the separators 15A and 15B are attached to the surface of the pillar inner panel 12 along the vertical direction of the vehicle body.

As shown in FIGS. 6, 7, and the like, in the separator 15A disposed on the upper side, the joining wall 20 is bent upward in the extending direction of the pillar main body 13 with respect to the base part 21a of the connecting wall 21, and the flange part 21c forming the guide part 22 is bent downward in the extending direction of the pillar main body 13. On the other hand, in the separator 15B disposed on the lower side, the joining wall 20 is bent to the lower side in the extending direction of the pillar main body 13 with respect to the base part 21a of the connecting wall 21, and the flange part 21c forming the guide part 22 is bent to the lower side in the extending direction of the pillar main body 13. Further, as shown in FIG. 7, the extending end side of the connecting wall 21 of both separators 15A and 15B is inclined toward the lower part which is in a direction in which the drain hose 19, in a direction away from the pillar inner panel 12.

As shown in FIGS. 3 and 4, the guide part 22 of the respective separators 15A and 15B is configured to guide the drain hose 19 to a position at which the drain hose 19 does not block the filling hole 17 of the pillar inner panel 12 and the introduction hole 18 of the pillar stiffener 14.

Here, the introduction hole 18 of the pillar stiffener 14 is disposed above the filling hole 17 of the pillar inner panel 12 as shown in FIGS. 3 and 4. The guide part 22 of the respective separators 15A and 15B is configured to guide the drain hose 19 so that the drain hose 19 is located below an upper end region 30a (see FIG. 4) of an introduction path 30 of the filler 16 that linearly connects the filling hole 17 and the introduction hole 18.

Further, as shown in FIGS. 2 and 5, another guide member 23 for guiding the drain hose 19 is attached to a position on the upper side in the longitudinal direction of the pillar main body 13 with respect to the upper separator 15A on the surface of the side facing the closed cross-section of the pillar inner panel 12. The guide member 23 guides the drain hose 19 in front of the upper separator 15A in the insertion direction of the drain hose 19 inside the pillar main body 13.

The guide member 23 is constituted by a metal plate, and has a first guide surface 23a that guides the drain hose 19 in a direction (upward) away from a lower inner surface 12u (see FIG. 5) of the pillar main body 13 in the insertion direction, and a second guide surface 23b that guides the drain hose 19 separated by the guide surface 23a to a lower inner surface 12u side (downward) of the pillar main body 13. The drain hose 19 guided by the first guide surface 23a and the second guide surface 23b of the guide member 23 is directed toward the guide part 22 closer to the lower part of the upper separator 15A. Therefore, the drain hose 19 is smoothly guided to the guide part 22 of the separator 15A.

In the above configuration, when the pillar main body 13 is assembled and the drain hose 19 is inserted and disposed inside the pillar main body 13 from above, the filler 16 is then filled into the pillar main body 13 through the filling hole 17. When the filling gun is inserted into the filling hole 17 and the filler 16 is supplied from the filling gun 17, the filler 16 flows into the closed cross-section between the pillar inner panel 12 and the pillar stiffener 14 as indicated by an arrow in FIG. 4. At this time, the filler 16 flows into the space part partitioned by the upper separator 15A and the lower separator 15B. A part of the filler 16 flowing into the closed cross-section between the pillar inner panel 12 and the pillar stiffener 14 wraps around the upper side of the drain hose 19 as indicated by an arrow in FIG. 4, and then flows into the closed cross-section between the pillar stiffener 14 and the pillar outer panel 11 through the introduction hole 18.

In this way, a predetermined amount of the filler 16 filled in the closed cross-section of the pillar main body 13 is cured in a state in which a part of the closed cross-section in the longitudinal direction is closed. Thereafter, the filling hole 17 of the pillar inner panel 12 is closed from the vehicle interior inner side by the lid member. In this way, when the filler 16 is filled into the pillar main body 13, the filled filler 16 can promote improvement in strength of the pillar main body 13 or improvement in sound insulation.

As described above, in the front pillar 10 (the pillar structure) of the present embodiment, the guide part 22 for guiding the drain hose 19 to a position at which the filling hole 17 is not blocked is provided in the separators 15A and 15B attached to the inside of the pillar main body 13. For this reason, when the filler 16 is filled into the pillar main body 13, the drain hose 19 can be disposed inside the pillar main body 13, without hindering the filling of the filler 16 from the filling hole 17.

Further, since the front pillar 10 of the present embodiment is not provided with a dedicated guide member for guiding the drain hose 19 in the vicinity of the filling hole 17, but is provided with the guide part 22 in the separators 15A and 15B, the number of components can be reduced.

Further, in the front pillar 10 of the present embodiment, the filling hole 17 is provided in the pillar inner panel 12 constituting a part of the pillar main body 13, and separators 15A and 15B are joined to the pillar inner panel 12 in which the filling hole 17 is provided. For this reason, the rigidity of the pillar inner panel 12 in which rigidity is lowered by providing the filling hole 17 can be supplemented by the joining parts of the separators 15A and 15B.

Further, in the front pillar 10 of the present embodiment, the separators 15A and 15B are equipped with a pair of joining walls 20, and a connecting wall 21 that joins the joining walls 20 to each other, each joining wall 20 is joined to a position on the outer side in the width direction and a position on the inner side in the width direction with respect to the center of the filling hole 17, and the guide part 22 that guides the drain hose 19 is provided on the connecting wall 21. For this reason, it is possible to efficiently increase the rigidity of the edge part of the filling hole 17 of the pillar inner panel 12 by the separators 15A and 15B.

Furthermore, in the case of the front pillar 10, since the guide part 22 is disposed on the side of the separators 15A and 15B separated from the pillar inner panel 12 (the extending end side of the connecting wall 21), it is possible to further limit the drain hose 19 from interfering with the flow of the filler 16 when the filler 16 is filled from the filling hole 17.

Further, the front pillar 10 of the present embodiment is configured so that the introduction hole 18 for introducing the filler 16 into the closed cross-section between the pillar stiffener 14 and the pillar outer panel 11 is provided in the pillar stiffener 14, and the guide part 22 of the separators 15A and 15B guides the drain hose 19 to a position at which the introduction hole 18 of the pillar stiffener 14 is not blocked. For this reason, the guide part 22 of the separators 15A and 15B can prevent the introduction hole 18 on the pillar stiffener 14 side from being blocked by the drain hose 19. Therefore, when the front pillar 10 of the present embodiment is adopted, the filler 16 can be smoothly filled into the closed cross-section between the pillar stiffener 14 and the pillar outer panel 11.

Further, the front pillar 10 of the present embodiment is configured so that the introduction hole 18 on the pillar stiffener 14 side is disposed above the filling hole 17 on the pillar inner panel 12 side, and the guide part 22 of the separators 15A and 15B guides the drain hose 19 such that the drain hose 19 is located below the upper end region 30a of the introduction path 30 of the filler 16 that linearly connects the filling hole 17 and the introduction holes 18. For this reason, even if the drain hose 19 hangs down due to its own weight between the separators 15A and 15B, the drain hose 19 does not greatly block the introduction path 30 of the filler 16 directed from the filling hole 17 toward the introduction hole 18.

When the filler 16 is filled, the filler flowing in from the filling hole 17 may be inclined downward little by little by its own weight on the way to the introduction hole 18. At this time, when the filler 16 comes into contact with the upper part of the drain hose 19 located below the upper end region 30a of the introduction path 30 of the filler 16, a traveling direction of the filler 16 changes again in a direction directed to the introduction hole 18. Therefore, when the front pillar 10 of the present embodiment is adopted, the filler 16 can be introduced more smoothly into the closed cross-section between the pillar stiffener 14 and the pillar outer panel 11.

Furthermore, the front pillar 10 of the present embodiment has the guide member 23 that guides the drain hose 19 on the front side of the separators 15A and 15B in the insertion direction of the drain hose 19 in the pillar main body 13 (the direction directed from the top to the bottom). Further, the guide member 23 has a first guide surface 23a that guides the drain hose 19 in a direction away from the lower inner surface 12u of the pillar main body 13, and a second guide surface 23b that guides the drain hose 19 separated by the first guide surface 23a to the lower inner surface 12u side of the pillar main body 13. For this reason, by cooperation of the first guide surface 23a and the second guide surface 23b of the guide member 23, the drain hose 19 can be easily directed in the direction of the guide part 22 close to the lower part of the upper separator 15A on the front side in the insertion direction. Therefore, when the front pillar 10 of the present embodiment is adopted, the drain hose 19 can be smoothly guided to the guide part 22 of the separator 15A.

Further, in the front pillar 10 of the present embodiment, the connecting wall 21 of the separators 15A and 15B is inclined in the direction away from the pillar inner panel 12 in the insertion direction of the drain hose 19. For this reason, when the drain hose 19 is inserted and disposed inside the pillar main body 13, the drain hose 19 is less likely to be caught by the separators 15A and 15B. Therefore, when the front pillar 10 of the present embodiment is adopted, the drain hose 19 can be easily disposed inside the pillar main body 13 when the pillar main body 13 is assembled.

Further, the present invention is not limited to the above embodiment, and various design changes can be made without departing from the scope of the invention. For example, in the above embodiment, although the drain hose 19 as the insertion member is disposed inside the pillar main body 13, the insertion member is not limited to the drain hose 19 and may be a wire harness or the like.

REFERENCE SIGNS LIST

1 Vehicle
10 Front pillar (pillar structure)
11 Pillar outer panel
12 Pillar inner panel
13 Pillar main body
14 Pillar stiffener
15A, 15B Separator
16 Filler
17 Filling hole
18 Introduction hole
19 Drain hose (insertion member)
20 Joining wall
21 Connecting wall
22 Guide part
23 Guide member
23a First guide surface
23b Second guide surface
30 Introduction path
30a Upper end region

What is claim is:

1. A vehicle pillar structure comprising:
a pillar main body having a closed cross-section extending along a longitudinal direction;
a separator which is attached to an inside of the pillar main body to extend in a direction intersecting the longitudinal direction of the pillar main body, and partitions the inside of the pillar main body into a plurality of space parts in the longitudinal direction; and
an insertion member which extends substantially along the longitudinal direction of the pillar main body and is disposed inside the pillar main body to straddle the plurality of the space parts,
wherein a filling hole for filling a filler into any one of the space parts inside is provided on a side wall of the pillar main body,
a guide part configured to guide the insertion member to a position at which the filling hole is not blocked is provided in the separator,
the pillar main body comprises a pillar outer panel which forms the closed cross-section, and a pillar inner panel,
the filling hole is provided in the pillar inner panel,
the separator is attached to the pillar inner panel,
the separator comprises at least two joining walls joined to the pillar inner panel at a position on an outer side in a width direction and at a position on an inner side in the width direction with respect to a center of the filling hole, and a connecting wall which extends in a direction intersecting the longitudinal direction of the pillar main body to connect the joining walls to each other, and
the guide part is provided on the connecting wall.

2. The vehicle pillar structure according to claim 1, wherein the pillar main body further comprises a pillar stiffener extending in the longitudinal direction to divide the closed cross-section of the pillar main body between the pillar outer panel and the pillar inner panel,
the pillar stiffener has an introduction hole for introducing the filler, which flowed into the closed cross-section between the pillar inner panel and the pillar stiffener from the filling hole, into the closed cross-section between the pillar stiffener and the pillar outer panel, and
the guide part is configured to guide the insertion member to a position at which the introduction hole is not blocked.

3. The vehicle pillar structure according to claim 2, wherein the introduction hole is disposed above the filling hole, and
the guide part is configured to guide the insertion member so that the insertion member is located below an upper end region of an introduction path of the filler which linearly connects the filling hole and the introduction hole.

4. The vehicle pillar structure according to claim 3, wherein a guide member which guides the insertion member on a front side of the separator in an insertion direction of the insertion member is provided inside the pillar main body, and
the guide member includes a first guide surface which guides the insertion member in a direction away from a lower inner surface of the pillar main body, and a second guide surface which guides the insertion member separated by the first guide surface to a lower inner surface side of the pillar main body.

5. The vehicle pillar structure according to claim 1, wherein the separator is inclined in a direction away from the pillar inner panel toward an insertion direction of the insertion member.

* * * * *